(12) United States Patent
Doyle

US007747924B2

(10) Patent No.: US 7,747,924 B2
(45) Date of Patent: Jun. 29, 2010

(54) METHOD AND APPARATUS FOR COPYING COPY PROTECTED OPTICAL DISCS

(75) Inventor: William Henry Christopher Doyle, Berkshire (GB)

(73) Assignee: Rovi Solutions Limited, Maidenhead (GB)

( * ) Notice: Subject to any disclaimer, the term of this patent is extended or adjusted under 35 U.S.C. 154(b) by 1067 days.

(21) Appl. No.: 10/559,985

(22) PCT Filed: Jun. 11, 2004

(86) PCT No.: PCT/GB2004/002517

§ 371 (c)(1), (2), (4) Date: Apr. 24, 2006

(87) PCT Pub. No.: WO2004/111912

PCT Pub. Date: Dec. 23, 2004

(65) Prior Publication Data

US 2006/0245320 A1 Nov. 2, 2006

(30) Foreign Application Priority Data

Jun. 13, 2003 (GB) .................................. 0313768.4

(51) Int. Cl.
*G11C 29/00* (2006.01)
(52) U.S. Cl. .................... 714/763; 380/201; 369/13.56; 369/30.03
(58) Field of Classification Search .................. 714/763; 380/201; 369/13.56, 30.03
See application file for complete search history.

(56) References Cited

U.S. PATENT DOCUMENTS 5,809,006 A * 9/1998 Davis et al. .............. 369/47.49

(Continued)

FOREIGN PATENT DOCUMENTS

EP 0 957 486 11/1999

(Continued)

OTHER PUBLICATIONS

CD freaks, <<New CloneDC v4.0—Introduction >> [online], Mar. 15, 2002, Available from : http//www.cdfreaks.com/article/70/1 [accessed Aug. 5, 2004].

(Continued)

*Primary Examiner*—Scott T Baderman
*Assistant Examiner*—Enam Ahmed
(74) *Attorney, Agent, or Firm*—Morrison & Foerster LLP (57) ABSTRACT

To copy a copy protected DVD (32), and thereby subvert the copy prot-ection technique, a DVD drive (50) is controlled by a disc copying program (54) to access data at a level other than that at the user data level. For example, if it is the data frame (44) which is read, the DVD drive (50) is controlled to write a data frame (12) to a copy disc (52). During the copying process, the program (54) may be arranged to remove sector IDs and error detection codes from the read data frames (44) and to generate new sector IDs and appropriate ID error detection codes for the data frames (12) to be written to the copy disc (52). This circumvents any copy protection which has been incorporated in the identification data in a data frame of the original disc (52).

34 Claims, 7 Drawing Sheets

U.S. PATENT DOCUMENTS

| | | | |
|---|---|---|---|
| 6,005,839 | A | 12/1999 | Sako et al. |
| 6,615,192 | B1 | 9/2003 | Tagawa et al. |
| 2002/0069389 | A1* | 6/2002 | Sollish et al. ............... 714/758 |
| 2002/0114456 | A1 | 8/2002 | Sako |

FOREIGN PATENT DOCUMENTS

| | | |
|---|---|---|
| EP | 1 227 482 | 7/2002 |
| JP | 05-266575 A | 10/1993 |
| JP | 2000357370 | 12/2000 |
| JP | 2001-016542 A | 1/2001 |
| JP | 2002-190157 A | 7/2002 |
| JP | 2002-528836 A | 9/2002 |
| WO | WO 00/23993 | 4/2000 |
| WO | WO 03/017272 | 2/2003 |

OTHER PUBLICATIONS

Opion : << *Copying Copy Protected CD's* >>, EBCVG.Com, Online !, Apr. 5, 2003, XP002293077, Retrieved from the Internet: <URL : http://ebcvg.com/articles.php?id=126 >, retrieved on Aug. 13, 2004, 6 pages.

Halderman, J.A. : << *Evaluating New Copy-Prevention Techniques for Audio CD's*>>, ACM Workshop on Digital Rights Mangaement, Nov. 2002, 14 pages.

Wallach, D.S. : << *Copy Protection Technology is Doomed* >>, Computer, IEEE Computer Society, Long Beach, CA, USA, vol. 35, No. 10, Oct. 2001, pp. 48-49.

G@M3FR3@K: << *What is RAW?* >>, CD FREAKS.COM, Online !, May 1, 2001, XP002293078, Retrieved from the Internet : <URL : http://knowhow.cdfreaks.com/article.php?IP=118>, retrieved on Aug. 13, 2004, 2 pages.

Anonymous : << *Insektors* >>, GOWAP, Online !, May 19, 2002, XP002293079, retrieved from the Internet : <URL : http://gowap2002free.fr/html/insektors.htm>, retrieved on Aug. 16, 2004, 5 pages.

Miller, M.L. et al. : *Watermarking in the Real world : An Application to DVD* >>, Signals, Systems, and Computers, 1999. Conference Record of the Thirty-Thiird Asilomar Conference on Oct. 24-27, 1999, Piscataway, NJ, USA, IEEE, USA, pp. 1497-1502.

Main, A., Van Oorschot, P.C. : << *Software Protection and Application Security : Understanding the Battleground* >>, Internet Article, Online!, Dec. 31, 2003, XP002293080, Retrieved from the Internet : <URL : http://www.scs.carleton.ca/{paulv/papers/softprot8a.pdf>, retrieved on Aug. 13, 2004, pp. 1-19.

Kelin, J. Kuhn : *CD/ROM—An Extension of the CD Audio Standard* >>, Internet Article, Online !, Mar. 25, 2003, XP002293081, Retrieved from the Internet : <URL : http://www.ee.washington.edu/conselec/CE/kuhn/cdrom/95x8.htm>, retrieved on Aug. 13, 2004, 8 pages.

GB Search Report for GB 0313768.4 dated Aug. 5, 2004, 2 pages.

PCT Search Report for PCT/GB2004/002517 dated Sep. 20, 2004, 4 pages.

Halderman, J.A. (Nov. 2002). "Evaluating New Copy-Prevention Techniques for Audio CDs," *presented at ACM Workshop on Digital Rights Management*, Washington, D.C., Nov. 18, 2002, 18 pages.

* cited by examiner

METHOD AND APPARATUS FOR COPYING COPY PROTECTED OPTICAL DISCS

The present invention relates to a method and apparatus for copying optical discs which, for example, enables copy protected optical discs to be reliably copied. The invention also extends to software or firmware for use with an optical disc drive to enable the copying of optical discs.

There are many techniques for copy protecting optical discs. For example, EP-A-1227482 and WO 02/11136 describe signature methods of copy protection in which an authenticating signature is added to the information carried by an optical disc. When it is required to access the disc, software carried by the disc requires initially that the existence of the signature be verified. If the signature is not found access to the data on disc is denied.

It is important that the authenticating signature is not copied when a genuine disc is copied. This can be achieved, for example, as in EP-A-1227482, by providing as the signature a pattern of deliberate errors at predetermined locations. When a disc drive is used to read a disc and then to copy the data, only the information on the disc is accessed and corrected information is written to the copy disc. This means that the copy disc cannot be authenticated as required.

In non-signature methods of copy protection, data is added to the information on the disc which will not generally cause any problems when an original disc is read or played but which adversely affects, or stops, the copying action of a consumer disc drive. There are very many examples of such copy protection means of which WO-A-0074053 is just one example.

The present invention seeks to provide means to defeat such copy protection techniques.

According to a first aspect of the present invention there is provided a method of copying a copy protected optical disc, the method comprising the steps of reading data from an optical disc at a selected level which differs from the user data level, and writing the data read from said selected level to an optical disc to create a usable copy of a copy protected optical disc.

It will be appreciated that when user data is applied to an optical disc it is subject to a number of formatting processes such as error correction, interleaving and encoding. These processes can be thought of as creating a number of data levels from the highest level, which is the user data level, through a number of lower levels, to the lowest data level, which is the encoded data level at which the data is provided as a series of 0s and 1s which are represented as pits and lands on the surface of the optical disc.

The invention is described herein with particular relevance to DVD formats. In this respect, recordable and rewritable DVDs and DVD writers are becoming increasingly available. Furthermore, because DVDs have much larger storage capabilities than CDs, they are increasingly becoming the optical disc of choice for numbers of applications and it is foreseen that, at least in the short to medium term, DVDs will take over where once CDs were pre-eminent. However, this invention is not limited to DVDs and may be used with all formats of CDs, with all formats of DVDs, and with other formats of optical discs whether available now or in the future.

In an embodiment, the data levels at least comprise, from highest to lowest, the user data level, a data frame level, an error corrected level, and an encoded data level, and the data is read from the optical disc at the error corrected level.

For example, the method may comprise reading the data from the error corrected level without any error correction codes, and writing the read data to an optical disc, the writing step involving generating error correction codes for the read data.

This embodiment is particularly useful, for example, where copy protection has been added to the optical disc by altering the data and/or the error correction codes. By reading the data from the error corrected level, but without any error correction codes, the base data can be accurately written to the copy disc. The writing step, in this case, will involve generating appropriate error correction codes for the data being written.

In an alternative embodiment, which is particularly useful for defeating signature methods of copy protection, the method comprises reading the data from the error corrected level together with any error correction codes and writing the read data to an optical disc.

Where a signature method, for example, relies upon the fact that error correction codes are discarded as the data on the disc is read, the copy protection can be defeated by directly reading the data together with the original error correction codes from the disc and applying this data with the codes to the copy disc. By this means an authenticating signature is added to the copy disc.

Preferably, writing the read data to an optical disc comprises interleaving the read data together with the error correction codes, encoding the interleaved data in accordance with EFM Plus encoding and writing the resultant bit stream to the optical disc.

In an alternative embodiment, the data levels at least comprise, from highest to lowest, the user data level, a data frame level, an error corrected level, and an encoded data level, and the data is read from the optical disc at the data frame level.

For example, the method may comprise reading the data from the data frame level without any additional codes, and writing the read data to an optical disc, the writing step involving generating additional codes for the read data. The additional codes generated may include sector numbers.

This method is particularly useful to defeat copy protection where, for example, sector numbers and other additional codes have been changed at the data frame level. In one such copy protection technique, the sector numbers used may be chosen so that they are not sequential, and/or may miss some numbers in sequence, and/or may be duplicated. Such alterations do not affect the normal play of an original disc as the player requires only to address particular sectors by number. If a sector number has been omitted, for example, it is only necessary to ensure that the player is never asked to access a sector with that number. However, a DVD writer will generally perform a copying operation by accessing the sectors in sequential order. Missing sector numbers, sector numbers in a non-sequential order, and duplicate sector numbers all provide difficulties to the DVD writer and may cause it to fail either to read or to copy.

Such copy protection measures can be defeated by reading the data from the data frame level without the additional codes and generating appropriate additional codes upon writing the data to the copy disc.

Where a copy protection method, for example, relies upon the fact that the additional codes are discarded as the data on the disc is read, the copy protection can be defeated by directly reading the data at the data frame level together with the sector numbers and other additional codes. The data together with the additional codes is applied to the disc.

Preferably, writing the read data to an optical disc comprises scrambling and subsequently error correcting the read data together with the additional codes, interleaving the error corrected data, encoding the interleaved data in accordance with EFM Plus encoding and writing the resultant bit stream to the optical disc.

In a further alternative embodiment, the data levels at least comprise, from highest to lowest, the user data level, a data frame level, an error corrected level, an interleaved level, and an encoded data level, and the data is read from the optical disc at the interleaved level, and the method further comprises writing the read data to an optical disc.

In a still further embodiment of the invention, the data levels at least comprise, from highest to lowest, the user data level, a data frame level, an error corrected level, and an encoded data level, and the data is read from the disc at the encoded data level, and further comprising writing the read encoded data to an optical disc.

The encoded data is the stream of bits, that is, 0s and 1s, which is generated from the pits and lands on the optical disc. All forms of copy protection can be overcome if the data is read at this lowest level and directly applied to the copy disc.

Preferably, the read encoded data is a bit stream in accordance with EFM Plus encoding and the bit stream is written to the optical disc.

The embodiments of the method as defined above may each further comprise the step of creating the Lead-In for the optical disc being written.

For example, the created Lead-In may specify the physical characteristics and/or manufacturing information for the optical disc being written.

These methods enable circumvention of copy protection techniques where the optical disc carries software requiring an authentication program to be run as a precursor to data on the optical disc being accessed and where that authentication program requires physical characteristics and/or manufacturing information for the optical disc. If such authentication programs use data provided in the Lead-in, the authentication process can be circumvented by providing a created Lead-In which has appropriate data as required by an authentication program.

Instead of creating a new Lead-In for the copy disc, physical characteristics and/or manufacturing information for the optical disc being written can be specified and written to the Lead-In on the copy disc to replace the information from the original disc.

Preferably, the method further comprises the step of enabling reading and writing of discs using absolute sector addresses, and using the absolute sector addresses to read the entire data in the Lead-In of a copy protected optical disc, and writing the data read from the Lead-In to the Lead-In of the optical disc being written.

An alternative embodiment further comprises the step of enabling reading and writing of discs using negative relative sector addresses, and using the negative relative sector addresses to read the entire data in the Lead-In of a copy protected optical disc, and writing the data read from the Lead-In to the Lead-In of the optical disc being written.

The use of absolute sector addresses or negative relative sector addresses enables a DVD writer to access the Lead-In of an original disc and to thereby extract and write the data from that Lead-In to form the Lead-In to the optical disc being written.

The present invention also extends to apparatus for copying optical discs, the apparatus comprising means for reading data from an optical disc at a selected level which differs from the user data level, and means for writing the data read from said selected level to an optical disc.

In an embodiment, the means for reading data from an optical disc at a selected level comprises pickup means to detect the data carried on an optical disc, and decoding means for decoding the detected data, and the means for writing the data to an optical disc comprises encoding means for encoding the decoded data, and mastering means for representing the encoded data on an optical disc.

Alternatively, the means for reading data from an optical disc at a selected level comprises pickup means to detect the data carried on an optical disc, decoding means for decoding the detected data, and means for arranging the decoded data into a recording frame, and the means for writing the data to an optical disc comprises encoding means for encoding the data in the recording frame, and mastering means for representing the encoded data on an optical disc.

In another alternative embodiment, the means for reading data from an optical disc at a selected level comprises pickup means to detect the data carried on an optical disc, decoding means for decoding the detected data, de-interleaving means for arranging the decoded data into an ECC block, and the means for writing the data to an optical disc comprises interleaving means for interleaving the data in the ECC block, encoding means for encoding the interleaved data, and mastering means for representing the encoded data on an optical disc.

In a further alternative embodiment, the means for reading data from an optical disc at a selected level comprises pickup means to detect the data carried on an optical disc, decoding means for decoding the detected data, de-interleaving means for arranging the decoded data into an ECC block, and error correction decoding means for determining error corrected data from said ECC block, and the means for writing the data to an optical disc comprises error correction encoding means for encoding said error corrected data to form an ECC block, interleaving means for interleaving the data in the ECC block, encoding means for encoding the interleaved data, and mastering means for representing the encoded data on an optical disc.

Alternatively, the means for reading data from an optical disc at a selected level comprises pickup means to detect the data carried on an optical disc, decoding means for decoding the detected data, de-interleaving means for arranging the decoded data into an ECC block, error correction decoding means for determining error corrected data from said ECC block, and unscrambling means for unscrambling the determined error corrected data and forming a data frame, and the means for writing the data to an optical disc comprises scrambling means for scrambling the formed data frame, error correction encoding means for encoding said data frame to form an ECC block, interleaving means for interleaving the data in the ECC block, encoding means for encoding the interleaved data, and mastering means for representing the encoded data on an optical disc.

Preferably, the data is read from the data frame without any additional codes, and the means for writing the data to an optical disc comprises means for generating additional codes for the read data to form a data frame for input to said scrambling means.

In all of the embodiments of the apparatus set out above, said decoding and encoding means preferably operate in accordance with EFM Plus encoding, and said mastering means may comprise a laser cutter.

According to a further aspect of the present invention there is provided software or firmware for use with an optical disc drive to enable the copying of optical discs, the software or firmware comprising instructions for reading data from an optical disc at a selected level which differs from the user data level, and instructions to write the read data from the selected level to an optical disc to create a copy of the disc.

In an embodiment, the data levels at least comprise, from highest to lowest, the user data level, a data frame level, an error corrected level, and an encoded data level, and the software or firmware further comprises instructions to read the data from the optical disc at the error corrected level.

For example, the software or firmware may further comprise instructions to read the data from the error corrected level without any error correction codes, and to write the read data to an optical disc with the writing step involving generating error correction codes for the read data.

In an alternative embodiment, the software or firmware may comprise instructions to read the data from the error corrected level together with any error correction codes and to write the read data to an optical disc.

Alternatively, where the data levels at least comprise, from highest to lowest, the user data level, a data frame level, an error corrected level, and an encoded data level, the software or firmware may further comprise instructions to read the data from the optical disc at the data frame level.

For example, instructions may be provided to read the data from the data frame level without any additional codes, and to write the read data to an optical disc with the writing step involving generating additional codes for the read data.

Alternatively, the software or firmware may comprise instructions to read the data from the data frame level together with any additional codes, and to write the read data to an optical disc.

In an embodiment in which the data levels at least comprise, from highest to lowest, the user data level, a data frame level, an error corrected level, and an encoded data level, the software or firmware may further comprise instructions to read the data from the disc at the encoded data level, and to write the read encoded data to an optical disc.

Additionally and/or alternatively instructions to create the Lead-In for the optical disc being written may be provided.

Alternatively, instructions may be provided to specify physical characteristics of the optical disc being written and to write the specified physical characteristics to the Lead-in on the optical disc.

Embodiments of the present invention will hereinafter be described, by way of example, with reference to the accompanying drawings in which.

As is made clear above, the present invention is applicable to optical discs in general, but is described herein with reference to DVD formats.

The processes for formatting the user data to be applied to a DVD is in accordance with agreed conventions and is well understood. However, for clarity, the manner in which the data is formatted according to the DVD standards will now be briefly described. This process is applicable to all formats of DVD.

Figure 1:
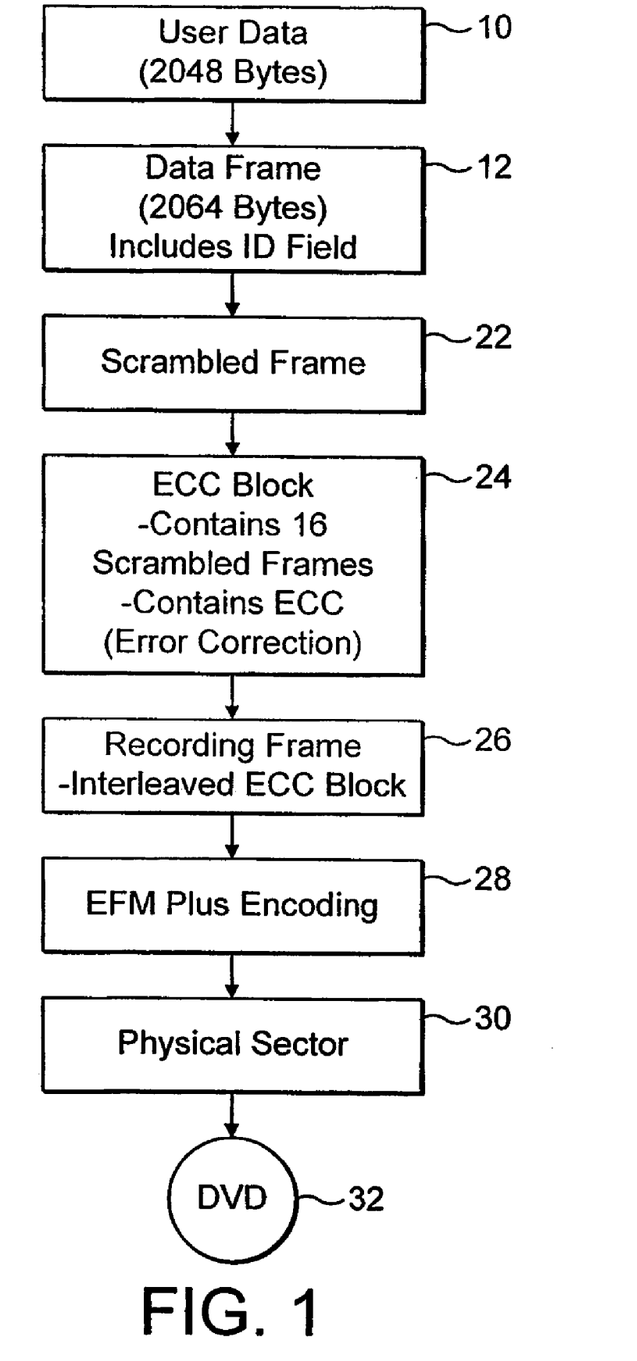
FIG. 1 shows schematically the writing of data to a DVD disc.

FIG. 1 shows the steps which are taken in formatting user data to be applied to a DVD. This user data is the information which is to be written to, and accessed from, the disc and may comprise text, graphics, video, audio, programs, control data and/or any other sort of data. As is indicated in FIG. 1, the user data is organised into blocks 10 which each contain 2,048 bytes. The first step in the formatting is to incorporate each block 10 of user data into a corresponding data frame 12 which has 2064 bytes. The additional bytes Incorporate identification and error correction codes.

Figure 2:
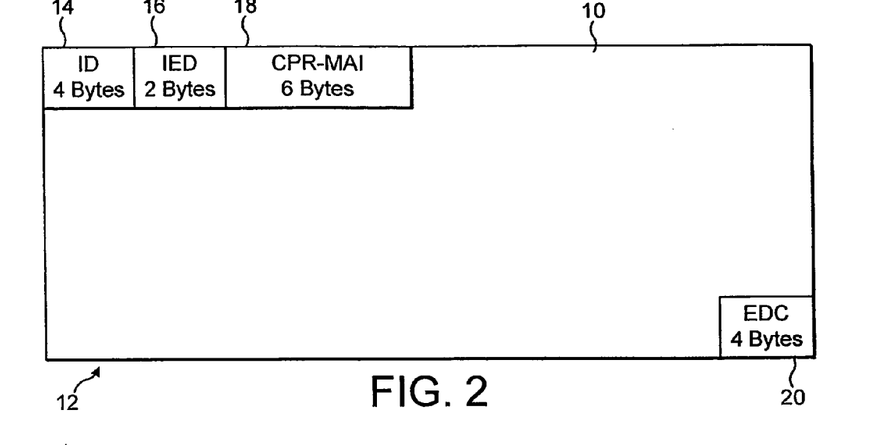
FIG. 2 shows a DVD data frame formed during the formatting of the data to be written.

The format of a DVD data frame 12 is shown in more detail in FIG. 2. The data frame 12 comprises twelve rows of data which each have 172 bytes and the first twelve bytes of the first row incorporate four bytes of identification data 14, two bytes of error detection code 16 for the identification data, and six bytes of copyright management information 18. The user data fills up the rest of the first row and is arranged in the following rows. At the end of the last row of the data frame 12 four bytes of error detection code 20 are provided. This is used to detect errors in the user data.

As is further shown in FIG. 1, the data frame 12 is then scrambled to form a scrambled frame 22. This scrambling is to remove repeated sequences of data. The scrambling may be performed by XORing sixteen consecutive data frames with a first table and then XORing the next sixteen consecutive data frames with a second table and so on. The scrambled frame 22, therefore, includes 16×16 data frames 12.

Figure 3:
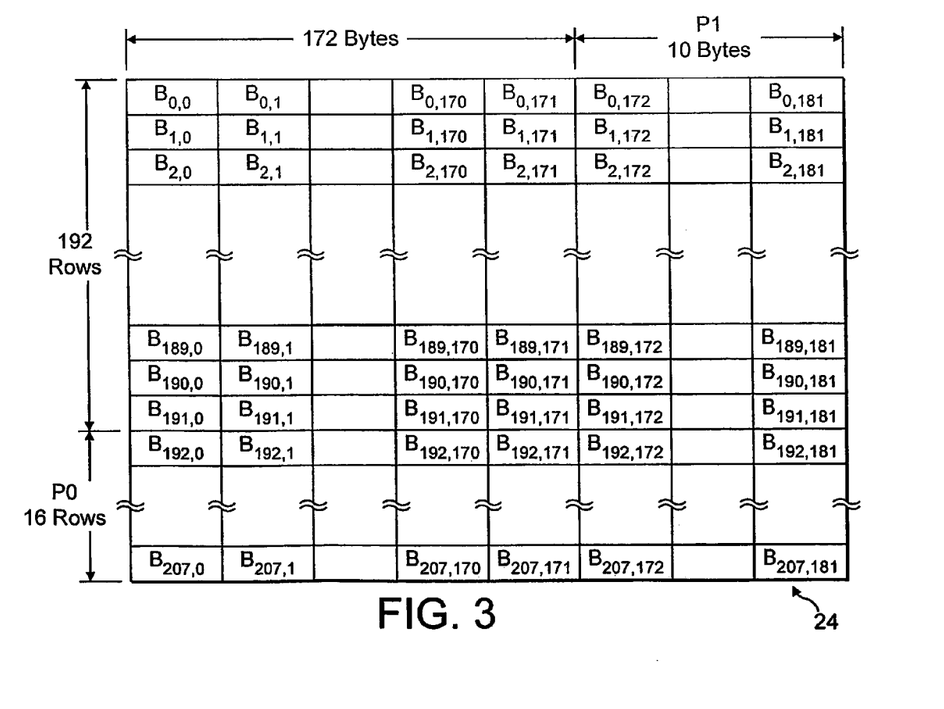
FIG. 3 shows an ECC block formed during formatting of the data to be written.

Next an ECC block 24 is formed by error correction encoding in which sixteen consecutive scrambled frames 22 are arranged into an array having 192 rows each containing 172 bytes. An example of an ECC block 24 is shown in FIG. 3. It will be seen that to each of the 172 columns, sixteen bytes PO of "outer parity" have been added and to each of the resulting 208 rows ten bytes PI of "inner parity" are added. These parity bytes PO and PI are error correction codes related to the data in the rows and columns by known and understood error correction techniques.

Figure 4:
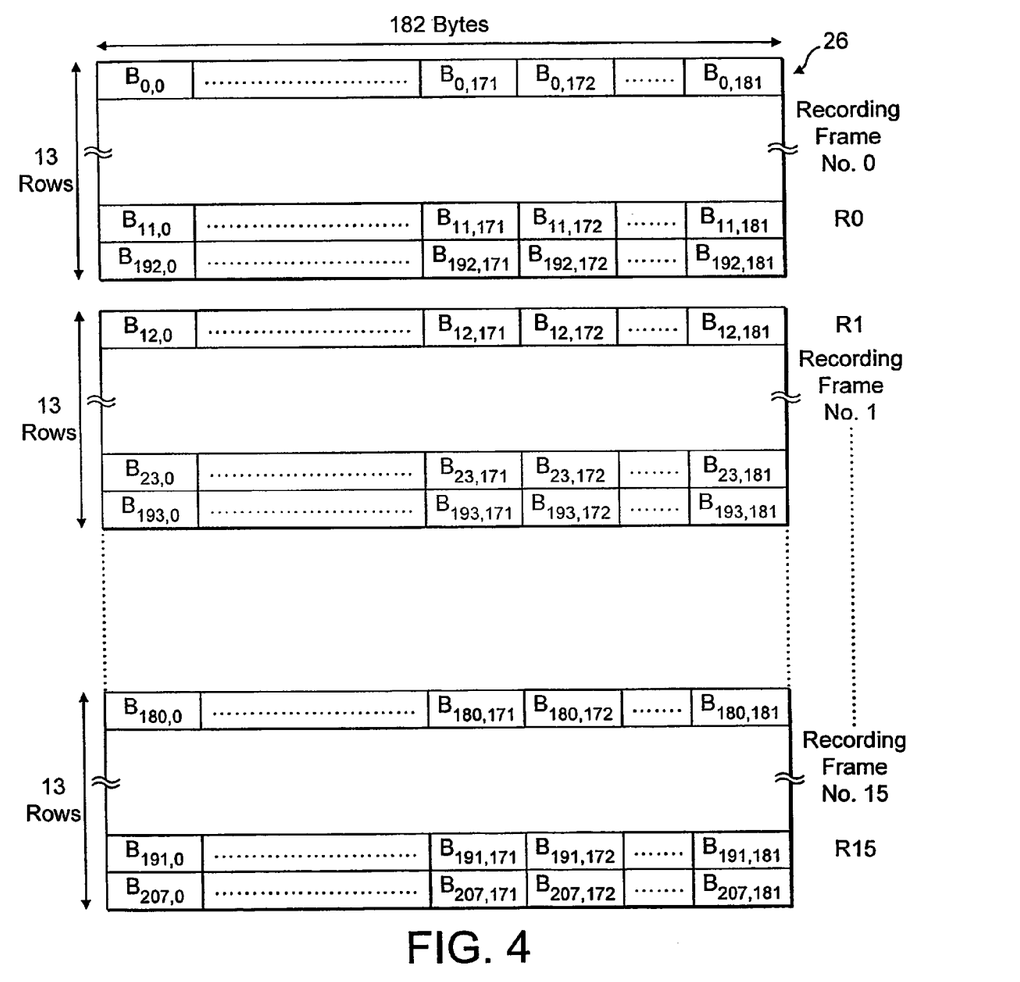
FIG. 4 shows a recording frame formed during formatting of the data to be written.

The ECC block 24 is then input to interleaving means to create sixteen recording frames 26. These recording frames 26 are created by interleaving rows from the ECC block 24. Thus, and as shown in FIG. 4, the 37,856 bytes contained in the ECC block 24 are rearranged into sixteen recording frames $R_0, R_1, \ldots R_{15}$ each of which has 2,336 bytes. Since each recording frame R has 182 columns there are sixteen recording frames each consisting of 13 rows.

Figure 5:
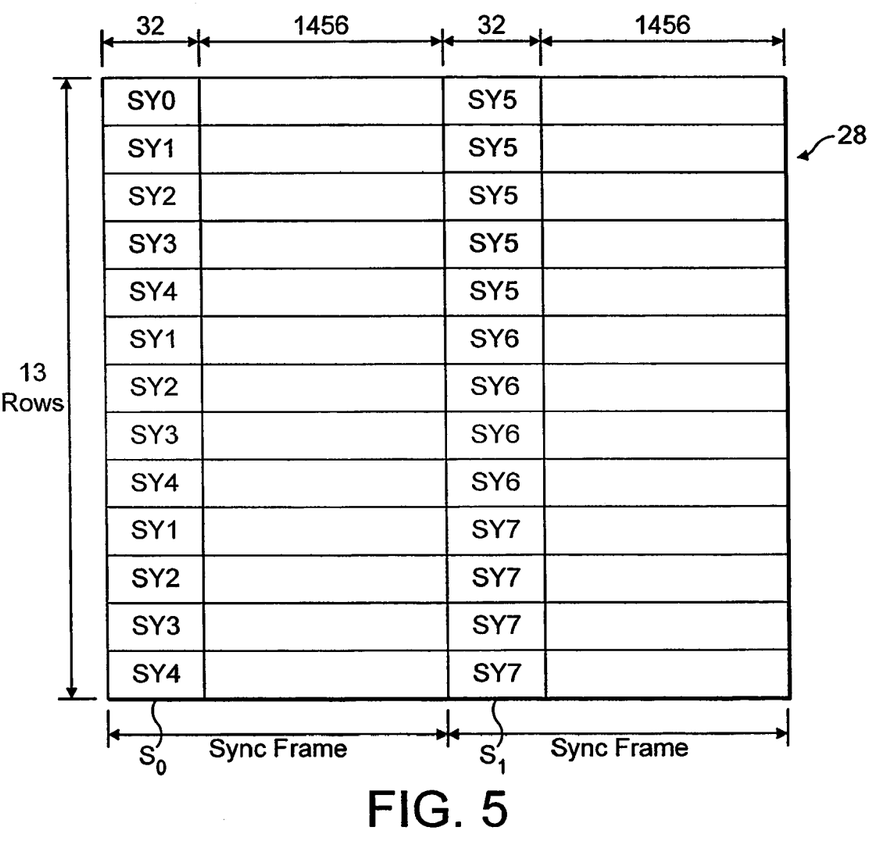
FIG. 5 shows a physical sector formed during formatting of the data to be written.

The recording frames 26 are then subjected to EFM Plus encoding whereby a sequence of bits 30, that is, a series of 0s and 1s, is produced. Thereafter the data 30 is arranged into sixteen physical sectors 28. One physical sector 28 is shown in FIG. 5. As can be seen, the EFM Plus encoded data 30 from each recording frame is split down the middle and one byte sync codes $S_0$, and $S_1$ are inserted in front of each half row. Thereafter, the resulting sequence of bits 28 is applied to a disc 32.

EFM Plus encoding processes the data with 8 to 16 modulation, that is each eight bit byte is translated into a sixteen bit word or code word. This is done by selecting each sixteen bit word from a set of four state tables. The encoding is arranged to maintain a low level of DSV (Digital Sum Value).

The resulting data, where each transition from a pit to a land represents a 1 and the lack of a transition represents a 0, is converted to NRZI format, that is Non-Return to Zero Inverted. The bit stream is then written to the disc 32 by an appropriate mastering means. In this respect, in an DVD writer the mastering means will generally be a laser cutter. Laser cutters are also used in mastering houses, but alternative mastering techniques are available and may be utilised.

Figure 6:
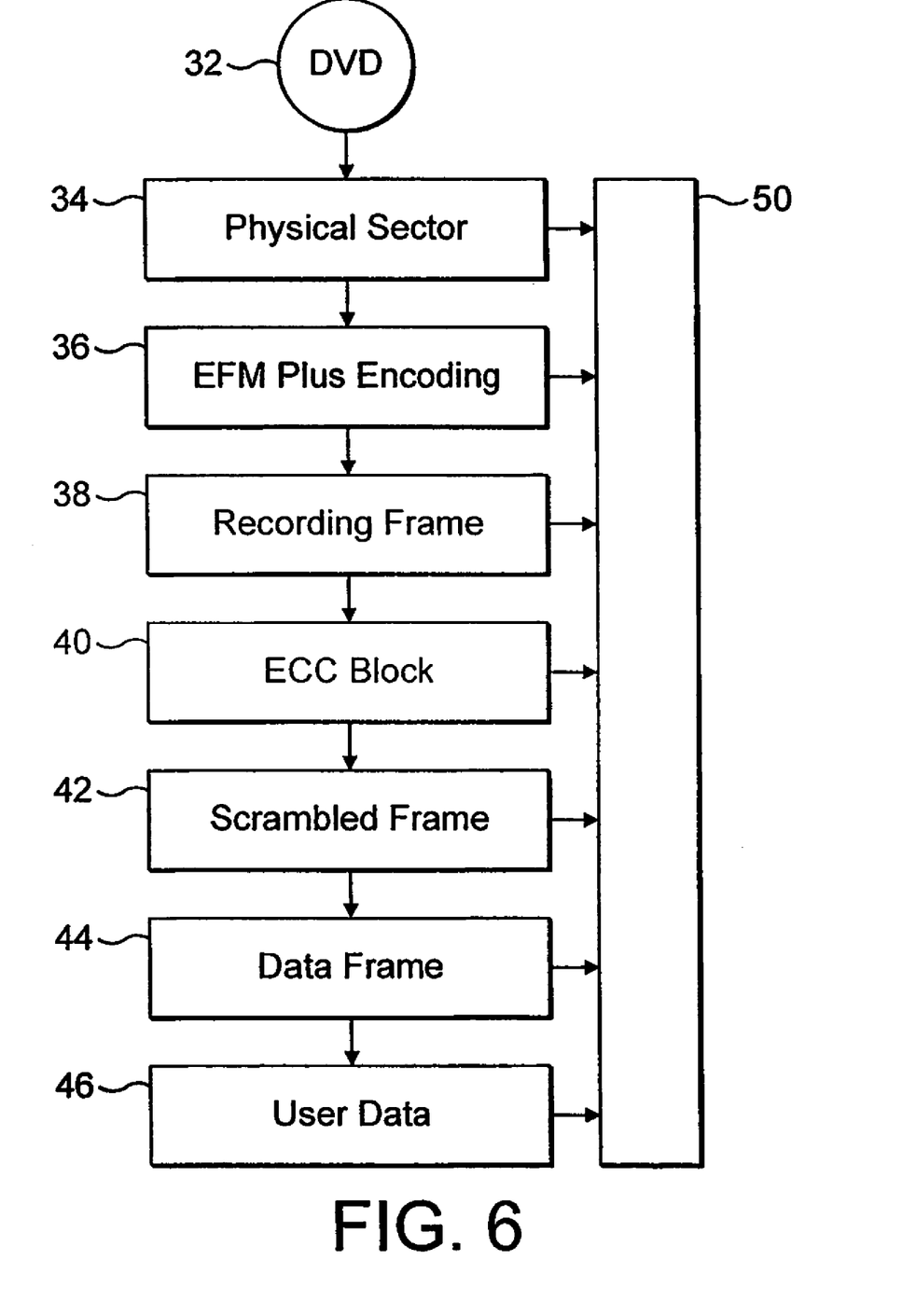
FIG. 6 shows schematically the reading of data from a DVD disc.

When it is required to read the disc 32, for example, to use the information written thereto, a reverse process takes place. Thus, and as is indicated in FIG. 6, the stream of bits obtained from the disc 32 by way of appropriate pickup means is subjected to transition detection, is formed into physical sectors 34 and is then subjected to EFM Plus decoding by way of an EFM Plus decoder to produce decoded data 36. The decoded data 36 is then used to produce recording frames 38 which are then applied to de-interleaving means to de-interleave the rows thereof and thereby create an ECC block 40. The ECC block 40 is subjected to error correction decoding to produce data frames 44 from which the user data 46 can be accessed.

Figure 7:
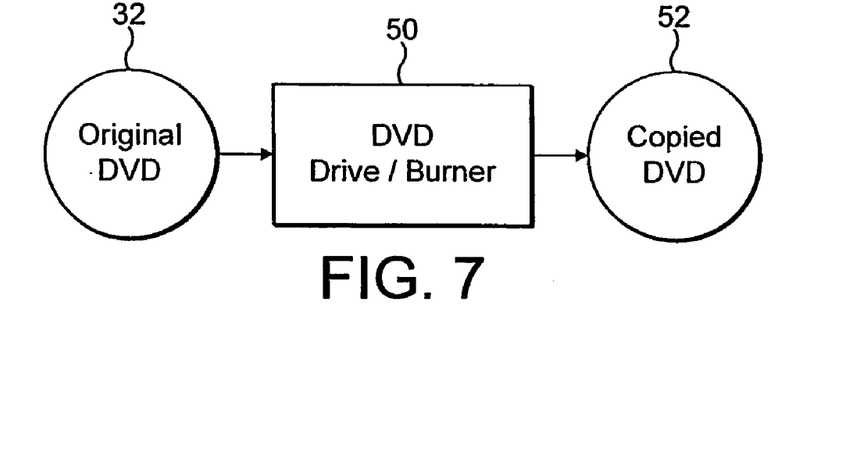
FIG. 7 shows a conventional method of copying a DVD disc.

FIG. 7 indicates schematically the copying of a DVD 32 by way of a DVD drive 50. The DVD drive 50 has the capability to play a DVD, to read the data on the DVD and to write data to a recordable or rewritable DVD. In this respect, and as is well known, the DVD drive 50 will read the data from the original DVD 32 by the process indicated in FIG. 6. Therefore, the DVD drive accesses user data 46 from the original disc. The DVD drive then writes the user data 46 to produce the copy DVD 52.

However, it is often the case that the process used to write data to a master DVD disc in order to produce original discs had incorporated copy protection techniques. There are many methods of providing copy protection but, as a generality, they are usually designed either to stop the DVD drive 50 from being able to write to the copy disc 52 or to ensure that the resulting copied disc 52 is degraded or unusable. Most copy protection schemes work at the level of the user data.

One method of copy protection, for example, is to manipulate the identification data 14 in a data frame 12. The sector ID 14 provides a sector number which identifies each individual data frame and acts as an address for the data in each data frame during use of the data. When the data on the DVD 32 is being played, various sectors of data will be accessed by way of their sector addresses and in accordance with the programming on the disc. However, a DVD drive as 50 when controlled to read and copy data from the DVD 32 will generally access the sectors in sequence. Because of this, copy protection can be provided by generating out of sequence sector numbers, and/or by repeating sector numbers, and/or by omitting sector numbers. Such manipulations do not adversely interfere with normal utilisation of the disc but will provide problems when it is required to copy the disc.

Figure 8:
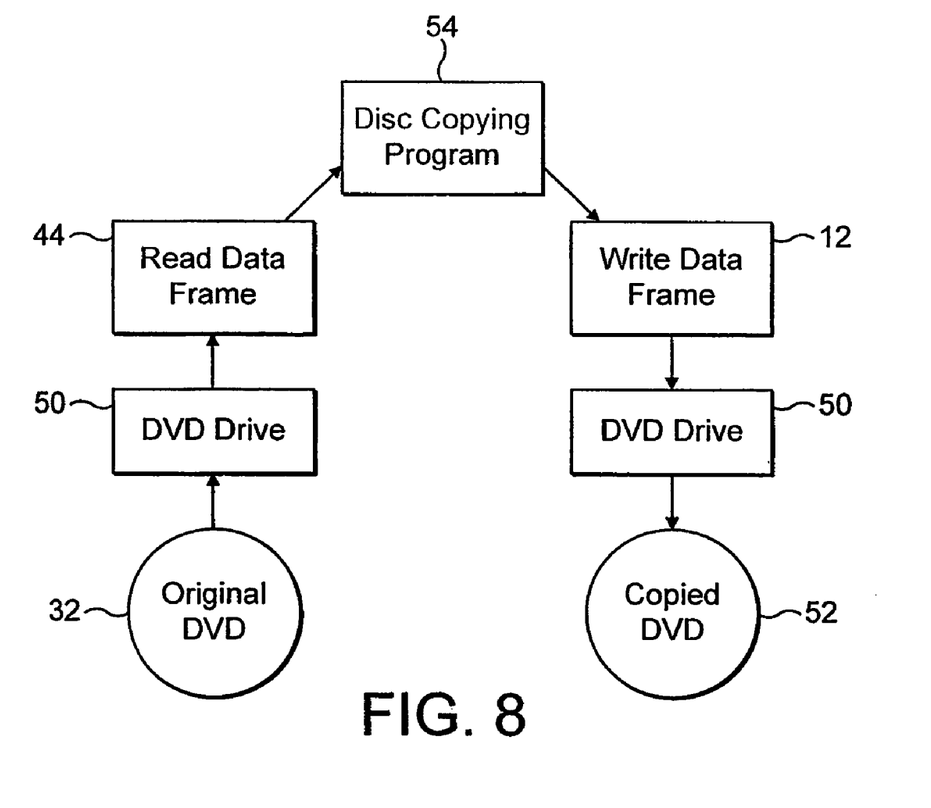
FIG. 8 shows one example of a method of copying a DVD disc in accordance with the invention.

FIG. 8 illustrates a method of the invention to subvert such a copy protection technique. As is illustrated in FIG. 8, the DVD drive 50 is controlled by way of a disc copying program 54 to access the data frame 12 rather than the user data. It is the data frame 12 as read which is then written to a copy disc 52 by way of the DVD drive 50. The DVD drive can be controlled to read the whole of each data frame 12 and to write that to disc whereby the copy disc 52 would incorporate the same copy protection. Alternatively, the program 54 could be instructed to remove the sector ID 14 and its error detection code 16 from each read data frame and to generate new sector IDs with appropriate ID error detection codes on writing the data frames to the copy disc 52.

It will be appreciated that to access the data frame 12 a pickup of the DVD drive 50 will detect the data carried on an original optical disc. The detected bit stream of 0s and 1s is arranged into physical sectors and then is applied to a decoder of the DVD drive 50 for EFM Plus decoding. The decoded output is then arranged into recording frames by appropriate data processing and buffering means. The recording frames are fed to a de-interleaver which de-interleaves the data rows thereof to form the ECC block 40. An error correcting decoder then determines error corrected data from the ECC block. This error corrected data is applied to unscrambling means where it is unscrambled to form a data frame 44.

The data frame 44 may then be processed to remove the identification code 14 and the error detection code 16. In this case, new identification codes and related error detection codes 14, 16 will need to be generated before the resultant data frame 44 is input to scrambling means of the DVD drive 50. Alternatively the data frame 44 as read may be applied to the scrambling means.

It will be appreciated that the DVD drive 50 not only incorporates all of the data handling elements as described above as used in the data reading process, but it also has appropriate programmable processing means to enable and control the reading process. Similarly the DVD drive 50 also incorporates all of the necessary data handling elements required to perform the writing process which is now described. The elements of a DVD drive 50 as used in the writing process are illustrated at FIG. 9.

Figure 9:
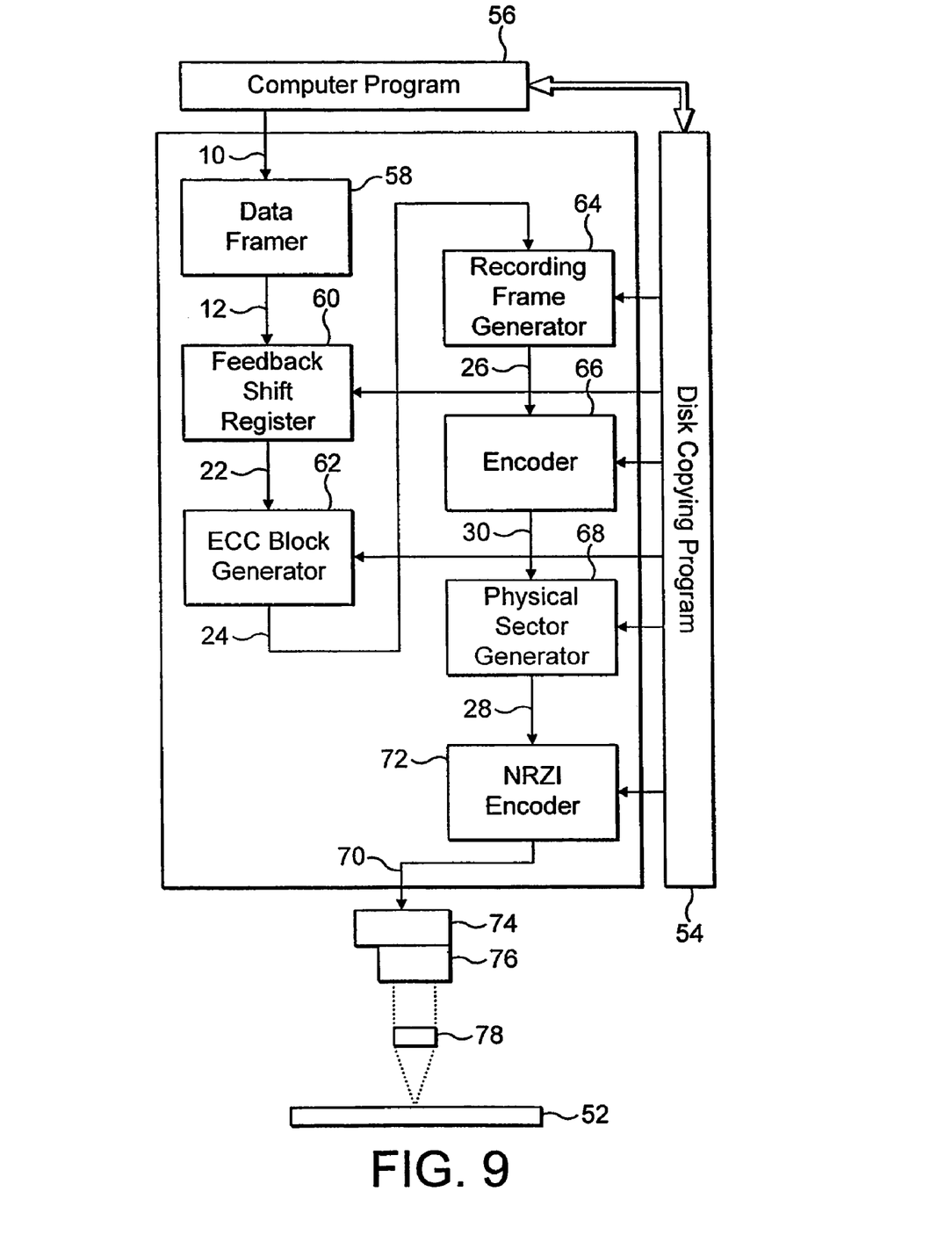
FIG. 9 shows schematically the elements of a DVD drive used in a writing process.

The DVD drive 50, as shown in FIG. 9, is controllable by a computer program 56 to write to a DVD 52. In normal use, the computer program 56 arranges the application of user data 10 to a data framer 58 which then outputs a data frame as 12. However, in performing the writing process illustrated in FIG. 8, the disc copying program 54 arranges the application of the data frame 44 directly to scrambling means in the form of a feedback shift register 60. The scrambled data frame 22 is then applied to an error correction encoder, for example, ECC block generator 62 which forms an ECC block 24. The ECC block is interleaved and then arranged into recording frames by way of a recording frame generator 64. The recording frames 26 are applied to an encoder 66 which uses EFM Plus encoding and the resultant bit stream is arranged into physical sectors 28 by a physical sector generator 68. The resultant bit stream is applied to an NRZI encoder 72 to form the NRZI encoded bit stream 70 for application to the DVD 52.

The bit stream 70 is written to the disc 52 by a laser cutter which comprises an optical pickup 74, a laser diode 76, and a lens 78.

All of the data handling elements which take part in the described copying process will generally be provided in conventional DVD writers, either as hardware, or rendered in firmware or software. However, to enable a conventional DVD writer to perform copying methods of the invention software or firmware will need to be incorporated into the conventional DVD writer to modify the writer, and in particular, the data handling processes it undertakes. The modifications can be incorporated into the data copying program 54, for example. In this respect, FIG. 9 illustrates that data may be selectively applied, by way of the disc copying program 54, directly to any one of the elements 60, 62, 64, 66, 68 or 72. Of course, DVD writers may be provided with appropriate hardware, firmware and/or software which are enabled to perform methods of the invention without modification.

As has been indicated previously, the copying program 54 can be used to select the level of the data to be read by the DVD drive 50 and the selected data can then be written by the DVD drive to the copy disc 32. It will be appreciated that the level in FIG. 6 at which the data is accessed will determine the corresponding level in FIG. 1 at which the writing process is commenced. In general, the lower the level of the data read, the more exact the copy produced. For example, if the original disc 32 is read at the encoded data level 34 the steam of 0s and 1s can be directly applied to a copy disc and all copy protection techniques will thereby be circumvented.

Signature techniques for copy protection often require for their effectiveness the discarding of error correction information during reading from a DVD disc. Such a copy protection technique can be defeated by reading the data from a DVD disc at the level of the ECC block 40. Where the error correction codes have been manipulated as part of the copy protection technique, it may be required to access the ECC block which contains both the data and the error correction codes and to write the ECC block to an optical disc. In other situations it may be better to decode the ECC block to determine the data and then to encode that data, thereby generating new error correction codes in the normal manner during the process of writing to disc.

Similarly, it is possible to read the recording frames 38 and to write those frames to the copy disc. Taking the data at the level of the recording frames 38 should defeat most copy protection techniques.

The data on a DVD is arranged to have a Lead-In zone, a main data zone, and a Lead-Out zone. Currently, DVD writers are generally unable to write information from the Lead-In zone of an original disc to a copy disc. This can cause problems, for example, where data in the Lead-In zone is required by an authentication program to enable access to the disc.

This copy protection technique can be circumvented by causing the DVD drive 50 to create a Lead-In zone for a copied disc which is not copied from the original disc. The copying program 54 could specify physical characteristic information to be stored in the created Lead-In of the copy disc and similarly it could be arranged to specify manufacturing information for the Lead-In. An authentication program will then find appropriate data in the Lead-In and will thereby be caused to authenticate the copied disc.

Presently, DVD drives are not typically enabled to read the data contained in the Lead-In zone. This is because DVD drives access data by using relative sector addresses which are sector numbers relative from the start of the track being accessed. By contrast absolute sector addresses are counted from the very start of the disc.

It is proposed to give the DVD drive 50 the ability to access the whole of the Lead-In zone by using absolute sector addresses or negative relative sector addresses. By this means, the DVD drive 50 is enabled to read the entirety of the Lead-In zone and could then write an entire Lead-In zone to a copy disc. The Lead-In zone written could be an exact replica of that on the original disc or could be manipulated to include different data.

It will be appreciated that further modifications and variations to the techniques described may be made within the scope of this invention as defined by the accompanying claims.

The invention claimed is:

1. A method of copying a copy protected optical disc, the method comprising the steps of:
    reading data from an optical disc at a selected level which differs from the user data level, and
    writing the data read from said selected level to an optical disc to create a usable copy of a copy protected optical disc,
    wherein the data levels at least comprise, from highest to lowest, the user data level, a data frame level, an error corrected level, an interleaved level, and an encoded data level, and wherein the data is provided from the optical disc at a level above the encoded data level but below the user data level, and
    writing the provided data to an optical disc, commencing at a data level which corresponds to the data level from which the data has been provided and continuing through the data levels to produce encoded data in the form of a bit stream, which bit stream is written to the optical disc.

2. A method according to claim 1, further comprising providing the data from the error corrected level without any error correction codes, and wherein the writing includes generating error correction codes for the read data.

3. A method according to claim 2, wherein writing the read data to an optical disc comprises interleaving the read data together with the error correction codes, encoding the interleaved data in accordance with EFM Plus encoding and writing the resultant bit stream to the optical disc.

4. A method of according to claim 1, further comprising providing the data from the optical disc at the data frame level.

5. A method according to claim 4, wherein the data is provided from the data frame level without any additional codes, and the writing involves generating additional codes for the read data.

6. A method according to claim 5, wherein the additional codes generated include sector numbers.

7. A method according to claim 4, wherein the data is provided from the data frame level together with any additional codes.

8. A method according to claim 4, wherein writing the data to an optical disc comprises scrambling and subsequently error correcting the provided data together with the additional codes, interleaving the error corrected data, encoding the interleaved data in accordance with EFM Plus encoding and writing the resultant bit stream to the optical disc.

9. A method according to claim 1, further comprising providing the data from the optical disc at the interleaved level.

10. A method according to claim 1, further comprising creating a Lead-In for the optical disc being written.

11. A method according to claim 10, wherein the created Lead-In specifies the physical characteristics and/or manufacturing information for the optical disc being written.

12. A method according to claim 1, wherein the optical disc being written has a Lead-In, and further comprising specifying physical characteristics for the optical disc being written and writing the specified physical characteristics to the Lead-In on the optical disc.

13. A method according to claim 1, wherein the optical disc being written has a Lead-In, and further comprising specifying manufacturing information for the optical disc being written and writing the specified manufacturing information to the Lead-In on the optical disc.

14. A method according to claim 1, wherein the optical disc being written has a Lead-In, and further comprising enabling reading and writing of discs using absolute sector addresses, and using the absolute sector addresses to read the entire data in a, Lead-In of a copy protected optical disc, and writing the data read from the Lead-In to a Lead-In of the optical disc being written.

15. A method according to claim 1, further comprising enabling reading and writing of discs using negative relative sector addresses, and using the negative relative sector addresses to read the entire data in a Lead-In of a copy protected optical disc, and writing the data read from the Lead-In to a Lead-In of the optical disc being written.

16. Apparatus for copying copy protected optical discs, the apparatus comprising:
    a pickup which detects the data carried on an optical disc,
    a decoder coupled to the pickup and which decodes the detected data, a de-interleaver coupled to the decoder and which arranges the decoded data into an ECC block, and an error correction decoder coupled to the de-interleaver and which determines error corrected data from the ECC block, and an unscrambler coupled to the error correction decoder and which unscrambles the determined error corrected data and forms a data frame, and the apparatus further comprises writing detected data onto an optical disc, and comprising:

a feedback shift register which scrambles the formed data frame, an error correction encoder coupled to the feedback shift register and which encodes the data frame to form an ECC block, a recording frame generator coupled to the error correction encoder and which interleaves the data in the ECC block, an encoder coupled to the recording frame generator and which encodes the interleaved data, a mastering portion which represents the encoded data on an optical disc, and a disc copying program which selects the detected data from the ECC block, or the determined error corrected data, or the data frame and applies the selected data, respectively to the recording frame generator, the error correction encoder, or the feedback shift register.

17. Apparatus according to claim 16, wherein the data is provided from the data frame without any additional codes, and writing the data to an optical disc comprises generating additional codes for the read data to form a data frame for input to said feedback shift register.

18. Apparatus according to claim 16, wherein the decoding and encoding are in accordance with EFM Plus encoding, and wherein the mastering portion comprises a laser cutter.

19. A computer readable medium storing software or firmware for use with an optical disc drive to enable the copying of copy protected optical discs, the software or firmware comprising:

instructions for providing data from an optical disc at a selected level which differs from the user data level, and instructions to write the read data from the selected level to an optical disc to create a copy of the disc, wherein the data levels at least comprise, from highest to lowest, the user data level, a data frame level, an error corrected level, an interleaved level, and an encoded data level, and wherein the software or firmware further comprises instructions to provide the data from the optical disc at a level above the encoded data level but below the user data level, and instructions to undertake writing the provided data to an optical disc, commencing at a data level which corresponds to the data level from which the data has been provided, and the instructions causing the writing to continue through the data levels to produce encoded data in the form of a bit stream, and to write the bit stream to the optical disc.

20. A computer readable medium according to claim 19, further comprising instructions to provide the data from the error corrected level without any error correction codes, and instructions to include while writing the generation of error correction codes for the read data.

21. A computer readable medium according to claim 19, wherein the instructions for the writing comprise instructions to interleave the provided data together with the error correction codes, to form the interleaved data into physical sectors, to encode the data in the physical sectors in accordance with EFM Plus encoding and to write the resultant bit stream to the optical disc.

22. A computer readable medium according to claim 19, further comprising instructions to provide the data from the optical disc at the data frame level.

23. A computer readable medium according to claim 19, further comprising instructions to provide the data from the data frame level without any additional codes, and instructions for the writing to include the generation of additional codes for the read data.

24. A computer readable medium according to claim 23, further comprising instructions to generate additional codes including sector numbers.

25. A computer readable medium according to claim 22, further comprising instructions to provide the data from the data frame level together with any additional codes.

26. A computer readable medium according to claim 23, wherein the instructions to write the provided data to an optical disc comprise instructions to scramble and subsequently error correct the provided data together with the additional codes, to interleave the error corrected data, to form the interleaved data into physical sectors, to encode the data in the physical sectors in accordance with EFM Plus encoding, and to write the resultant bit stream to the optical disc.

27. A computer readable medium according to claim 19, further comprising instructions to provide the data from the optical disc at the interleaved level.

28. A computer readable medium according to claim 19, further comprising instructions to create a Lead-In for the optical disc being written.

29. A computer readable medium according to claim 28, further comprising instructions to specify in the created Lead-In the physical characteristics and/or manufacturing information for the optical disc being written.

30. A computer readable medium according to claim 19, further comprising instructions to specify physical characteristics of the optical disc being written and to write the specified physical characteristics to a Lead-In on the optical disc.

31. A computer readable medium according to claim 19, further comprising instructions to specify manufacturing information for the optical disc being written and to write the specified manufacturing information to a Lead-In on the optical disc.

32. A computer readable medium according to claim 19, further comprising instructions to enable reading and writing of discs using absolute sector addresses, and to use the absolute sector addresses to read the entire data in a Lead-In of a copy protected optical disc, and to write the data read from the Lead-In to a Lead-In of the optical disc being written.

33. A computer readable medium according to claim 19, further comprising instructions to enable reading and writing of discs using negative relative sector addresses, to use the negative relative sector addresses to read the entire data in a Lead-In of a copy protected optical disc, and to write the data read from the Lead-In to a Lead-In of the optical disc being written.

34. An optical disc produced by the method of claim 1.

* * * * *